United States Patent
Kim et al.

(10) Patent No.: US 10,338,435 B2
(45) Date of Patent: Jul. 2, 2019

(54) LIQUID CRYSTAL DISPLAY DEVICE HAVING UPPER AND LOWER ALIGNMENT LAYERS

(71) Applicant: SAMSUNG DISPLAY CO., LTD., Yongin-si, Gyeonggi-do (KR)

(72) Inventors: Jin Won Kim, Suwon-si (KR); Oh Jeong Kwon, Hwaseong-si (KR); Su Jin Kim, Seoul (KR); Dong Han Song, Hwaseong-si (KR); Ki Chul Shin, Seongnam-si (KR); Dong-Chul Shin, Seoul (KR); Sung-Jae Yun, Hwaseong-si (KR); Hyeok Jin Lee, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 644 days.

(21) Appl. No.: 14/945,026

(22) Filed: Nov. 18, 2015

(65) Prior Publication Data
US 2016/0274417 A1 Sep. 22, 2016

(30) Foreign Application Priority Data
Mar. 19, 2015 (KR) ........................ 10-2015-0038459

(51) Int. Cl.
*G02F 1/1337* (2006.01)
*G02F 1/1333* (2006.01)

(52) U.S. Cl.
CPC .. *G02F 1/133711* (2013.01); *G02F 1/133345* (2013.01); *G02F 1/133788* (2013.01);
(Continued)

(58) Field of Classification Search
CPC ......... G02F 1/133345; G02F 1/133711; G02F 1/133723; G02F 1/133788;
(Continued)

(56) References Cited

U.S. PATENT DOCUMENTS 8,514,357 B2 8/2013 Kim
8,619,222 B2 12/2013 Nakamura et al.
(Continued)

FOREIGN PATENT DOCUMENTS

EP 2330458 6/2011
EP 2330458 B1 * 12/2013 .............. C08L 79/08
(Continued)

OTHER PUBLICATIONS

Office Action dated May 10, 2017, in corresponding European Patent Application No. 16156903.3.
(Continued)

*Primary Examiner* — Sophie Hon
(74) *Attorney, Agent, or Firm* — F. Chau & Associates, LLC

(57) ABSTRACT

An exemplary embodiment of the present invention provides a liquid crystal display including a first insulation substrate. A pixel electrode is disposed on the first insulation substrate. A first alignment layer is disposed on the pixel electrode. A second insulation substrate faces the first insulation substrate. A common electrode is disposed on a surface of the second insulation substrate, which the surface of the second insulation substrate faces the first insulation substrate. A second alignment layer is disposed on a surface of the common electrode, which the surface of the common electrode faces the first insulation substrate. A liquid crystal layer is disposed between the first alignment layer and the second alignment layer. The liquid crystal layer includes liquid crystal molecules. Liquid crystal molecules adjacent to at least one of the first alignment layer and the second alignment layer have a pre-tilt angle. At least one of the first alignment layer and the second alignment layer has an ion inductor.

18 Claims, 7 Drawing Sheets

(52) U.S. Cl.
CPC ............ *G02F 2001/133397* (2013.01); *G02F 2001/133726* (2013.01); *G02F 2001/133742* (2013.01); *G02F 2001/133761* (2013.01); *G02F 2001/133773* (2013.01); *Y10T 428/1023* (2015.01)

(58) Field of Classification Search
CPC ........ G02F 2001/133397; G02F 2001/133726; G02F 2001/133742; G02F 2001/133761; Y10T 428/1023
See application file for complete search history.

(56) References Cited

U.S. PATENT DOCUMENTS

| | | | |
|---|---|---|---|
| 8,632,862 B2 | 1/2014 | Kim et al. | |
| 8,830,428 B2 | 9/2014 | Miyakawa et al. | |
| 2004/0257489 A1* | 12/2004 | Gotoh | G02F 1/136209 349/44 |
| 2011/0134382 A1* | 6/2011 | Miyakawa | G02F 1/133707 349/139 |
| 2011/0157531 A1 | 6/2011 | Suwa et al. | |
| 2011/0228190 A1* | 9/2011 | Yang | G02F 1/13394 349/56 |
| 2013/0314655 A1* | 11/2013 | Archetti | C09K 19/3003 349/124 |

FOREIGN PATENT DOCUMENTS

| | | |
|---|---|---|
| EP | 2843466 | 3/2015 |
| JP | 2006-085098 | 3/2006 |
| KR | 1020100084823 | 7/2010 |
| KR | 1020120088010 | 8/2012 |
| KR | 1020140037832 | 3/2014 |
| KR | 1020150012093 | 2/2015 |
| WO | 2013/156053 | 10/2013 |

OTHER PUBLICATIONS

Crown Ether, Edition: Andreas Schmidt, English translation of article, Final update: Aug. 2006, 6 pages.
European Search Report dated Jun. 9, 2016, in corresponding European Patent Application No. 16156903.3.

* cited by examiner

LIQUID CRYSTAL DISPLAY DEVICE HAVING UPPER AND LOWER ALIGNMENT LAYERS

CROSS-REFERENCE TO RELATED APPLICATION

This application claims priority under 35 U.S.C. § 119 to Korean Patent Application No. 10-2015-0038459 filed in the Korean Intellectual Property Office on Mar. 19, 2015, the disclosure of which is incorporated by reference herein in its entirety.

(A) TECHNICAL FIELD

Exemplary embodiments of the present invention relate to a liquid crystal display, and more particularly to a liquid crystal display having upper and lower alignment layers.

(B) DISCUSSION OF RELATED ART

A liquid crystal display may be a flat panel display. The liquid crystal display may include two sheets of display panels with field generating electrodes such as a pixel electrode, a common electrode, and a liquid crystal layer disposed between the two sheets of display panels. In the liquid crystal layer, voltages may be applied to the field generating electrodes to generate an electric field in the liquid crystal layer. The alignment of liquid crystal molecules of the liquid crystal layer may be determined by the electric field to control the polarization of incident light, and images may be displayed.

A vertically aligned (VA) mode liquid crystal display in which long axes of the liquid crystal molecules are arranged to be perpendicular to upper and lower display panels while electric fields are not applied may have a relatively high contrast ratio and may have a relatively wide standard viewing angle.

Generally, liquid crystal displays are becoming wider, and curved display devices are being developed to enhance immersion of viewers. After manufacturing the flat liquid crystal display by forming each of constituent elements in two display panels and combining the two display panels, the curved liquid crystal display may be realized by bending the combined display panels through a bending process.

Misalignment may be generated between the two display panels, thereby reducing transmittance.

SUMMARY

Exemplary embodiments of the present invention may provide a curved liquid crystal display having increased display quality. The curved display panel according to exemplary embodiments of the present invention may reduce or eliminate transmittance deterioration due to misalignment of the curved liquid crystal display and may reduce or eliminate panel spots.

The liquid crystal display according to exemplary embodiments of the present invention may reduce or prevent deterioration of display quality due to charge accumulation by substantially uniformly moving ion impurities disposed at a liquid crystal layer to upper and lower alignment layers by providing alignment layers disposed in upper and lower display panels.

An exemplary embodiment of the present invention provides a liquid crystal display including a first insulation substrate. A pixel electrode is disposed on the first insulation substrate. A first alignment layer is disposed on the pixel electrode. A second insulation substrate faces the first insulation substrate. A common electrode is disposed on a surface of the second insulation substrate, which the surface of the second insulation substrate faces the first insulation substrate. A second alignment layer is disposed on a surface of the common electrode, which the surface of the common electrode faces the first insulation substrate. A liquid crystal layer is disposed between the first alignment layer and the second alignment layer. The liquid crystal layer includes liquid crystal molecules. Liquid crystal molecules adjacent to at least one of the first alignment layer and the second alignment layer have a pre-tilt angle. At least one of the first alignment layer and the second alignment layer has an ion inductor.

The first alignment layer and the second alignment layer may each include a main chain and a side chain connected to the main chain.

At least one of the side chains of the first alignment layer and the second alignment layer may include a photo-reactive group or a photo-reactive derivative.

The side chain of the first alignment layer may include the photo-reactive group or the photo-reactive derivative.

The photo-reactive group or the photo-reactive derivative may include at least one of a benzophenone group, an acetophenone group, a benzoin ether group, and a benzyl group.

At least one side chain of the second alignment layer need not include the photo-reactive group and the photo-reactive derivative.

The side chain of the second alignment layer may include an ion inductor.

The ion inductor may include at least one of a pyridine group, a pyrimidine group, an indole group, a furan group, and a quinoline group.

At least one of the side chains of the first alignment layer and the second alignment layer may include a vertical alignment group.

The first alignment layer and the second alignment layer may include different materials from each other.

The liquid crystal molecules positioned near the first alignment layer may be pre-tilted.

The liquid crystal molecules positioned near the second alignment layer need not be pre-tilted.

The liquid crystal display may be a curved-type of liquid crystal display.

The liquid crystal display may be curved in a long-axis direction.

The liquid crystal layer may have negative dielectric anisotropy.

The liquid crystal layer may further include a reactive mesogen (RM).

One of the first alignment layer and the second alignment layer may include an alignment polymer. The reactive mesogen and the photo-reactive group or a photo-reactive derivative may be coupled to the alignment polymer.

One of the first alignment layer and the second alignment layer may include a first structural unit represented by Chemical Formula 1.

[Chemical Formula 1]

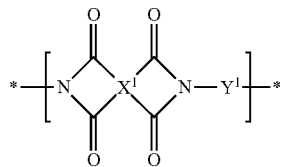

In Chemical Formula 1, $X^1$ is a tetravalent organic group derived from an alicyclic acid dianhydride or an aromatic acid dianhydride, $Y^1$ is a divalent organic group derived from an aromatic diamine, and at least one hydrogen of the divalent organic group is substituted by Chemical Formula 1A.

[Chemical Formula 1A]

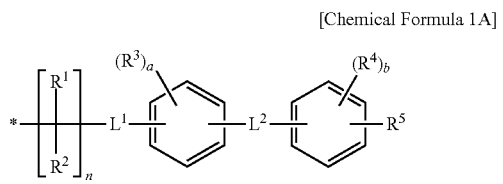

In Chemical Formula 1A, $R^1$ to $R^4$ are independently hydrogen or a substituted or unsubstituted C1 to C8 alkyl group, n is an integer that is in a range of 3 to 20, $R^5$ is a substituted or unsubstituted C1 to C30 alkyl group, "a" and "b" are independently integers that are in a range of 0 to 4, and $L^1$ and $L^2$ are independently a single bond, —O—, —S(=O)$_2$—, or —(C($R^x$)($R^y$))$_m$—, $R^x$ and $R^y$ are independently hydrogen atoms, or a substituted or unsubstituted C1 to C8 alkyl group, and m is an integer that is in a range of 1 to 20.

The first alignment layer may include a second structural unit represented by Chemical Formula 2.

[Chemical Formula 2]

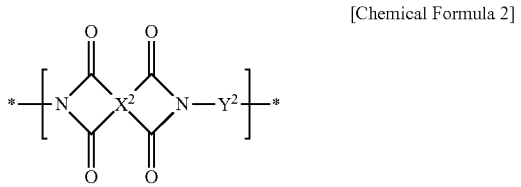

In the Chemical Formula 2, $X^2$ is a tetravalent organic group derived from an alicyclic acid dianhydride or an aromatic acid dianhydride, $Y^2$ is a divalent organic group derived from an aromatic diamine, and at least one hydrogen of the divalent organic group is substituted with Chemical Formula 2A or Chemical Formula 2B.

[Chemical Formula 2A]

[Chemical Formula 2B]

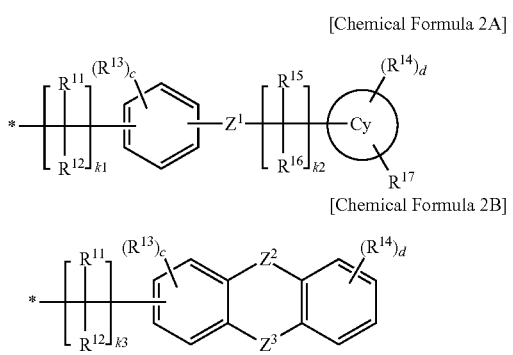

In Chemical Formula 2A and Chemical Formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, "c" and "d" are independently integers between 0 to 4, k1 and k3 are an integer between 3 to 20, k2 is an integer between 0 to 5, and $Z^1$ and $Z^2$ are independently —C(=O)—, and $Z^3$ is —S— or —C(=O)—.

One of the first alignment layer and the second alignment layer may include a third structural unit represented by Chemical Formula 3.

[Chemical Formula 3]

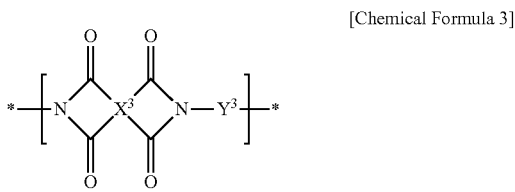

In Chemical Formula 3, $X^3$ is a tetravalent organic group derived from an alicyclic acid dianhydride or an aromatic acid dianhydride, $Y^3$ is a divalent organic group derived from an aromatic diamine, and $Y^3$ is a divalent organic group derived from the aromatic diamine, and at least one hydrogen of the divalent organic group substituted by a substituted or unsubstituted C5 to C30 straight chain or a branched chain alkyl group, $CH_2$ groups that are not adjacent to each other in the alkyl group may be substituted by —O—, —N($R^a$)—, —C(=O)O—, —C(=O)N($R^b$)—, —N($R^c$)C(=O)—, or —OC(=O)—, and $R^a$, $R^b$, and $R^c$ are independently hydrogen or a substituted or unsubstituted C1 to C8 alkyl group).

The curved liquid crystal display according to an exemplary embodiment of the present invention may have increased display quality by reducing or eliminating transmittance deterioration and remaining charge accumulation caused by misalignment of the upper and lower display panels.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION OF THE EMBODIMENTS

Figure 1:
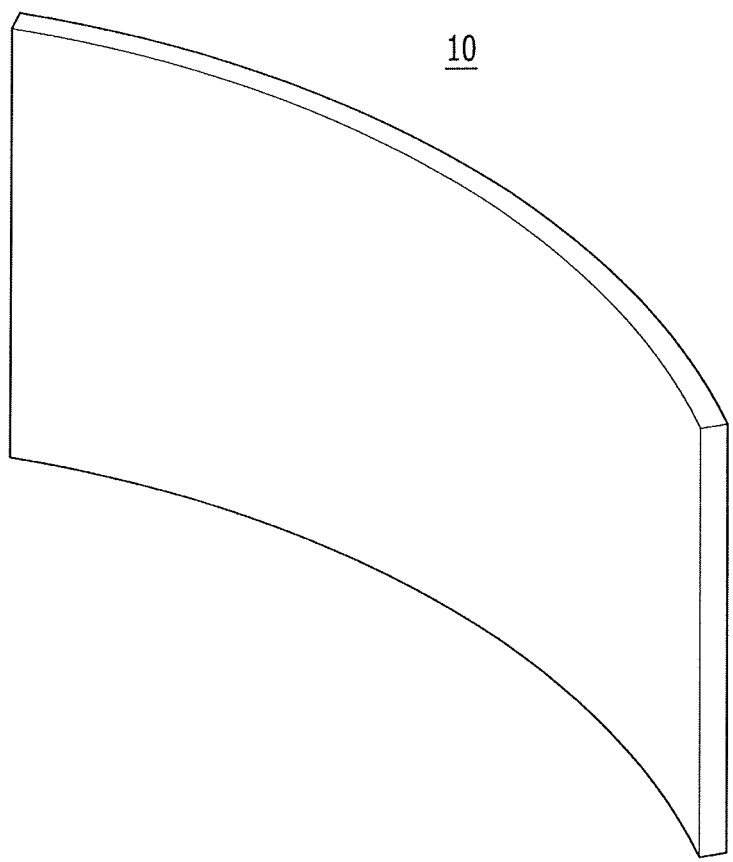
FIG. 1 is a perspective view of a liquid crystal display according to an exemplary embodiment of the present invention.

Hereinafter, exemplary embodiments of the present invention will be described in more detail with reference to the accompanying drawings. However, it is to be understood that exemplary embodiments of the present invention are not limited to the exemplary embodiments set forth herein. As those skilled in the art would realize, the exemplary embodiments may be modified in various different ways, all without departing from the spirit or scope of the present invention.

In the specification and drawings, the thickness of layers, films, panels, or regions may be exaggerated for clarity. It will be understood that when an element such as a layer, film, region, or substrate is referred to as being "on" another element, it may be directly on the other element or intervening elements may also be present. Like reference numerals may designate like elements throughout the specification and drawings.

In this specification, unless otherwise stated, when a target element is described as being "substituted", this may indicate that at least one hydrogen atom is substituted with a substituent selected from a set consisting of halogen atoms (F, Cl, Br, and I), a hydroxy group, a C1 to C20 alkoxy group, a nitro group, a cyano group, an amino group, an imino group, an azido group, an amidino group, a hydrazino group, a hydrazone group, a carbonyl group, a carbamoyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

In this specification, the prefix "hetero" may indicate that at least one heteroelement selected from a group consisting of at least one of N, O, S, and P are contained in a ring, unless otherwise stated.

In this specification, unless otherwise stated, the term "alicyclic" may indicate a C3 to C40 cycloalkyl, a C3 to C40 cycloalkenyl, a C3 to C40 cycloalkynyl, a C3 to C40 cycloalkylene, a C3 to C40 cycloalkenylene, or a C3 to C40 cycloalkynylene. Specifically, this indicates a C3 to C20 cycloalkyl, a C3 to C20 cycloalkenyl, a C3 to C20 cycloalkynyl, a C3 to C20 cycloalkylene, a C3 to C20 cycloalkenylene, or a C3 to C20 cycloalkynylene. The term "aromatic" may indicate a C6 to C40 aryl, a C2 to C40 heteroaryl, a C6 to C40 arylene, or a C2 to C40 heteroarylene. For example, the term "aromatic" may indicate a C6 to C16 aryl, a C2 to C16 heteroaryl, a C6 to C16 arylene, or a C2 to C16 heteroarylene.

Unless otherwise stated, the term "combination" may indicate a mixture or a copolymerization. For example, the term "combination" may indicate two or more rings being formed as a fused ring, or two or more rings being connected to each other by single bonding or a functional group such as —O—, —S—, —C(=O)—, —CH(OH)—, —S(=O)—, —S(=O)$_2$—, —SiCH$_{32}$—, —CH$_{2p}$— (e.g., p=1 or 2), —CF$_{2q}$— (e.g., q=1 or 2), —CCH$_{32}$—, —CCF$_{32}$—, —CCH$_3$, and CF$_3$— or —C(=O)NH—, in an alicyclic organic group and an aromatic organic group. Unless otherwise stated, the term "copolymerization" may indicate block copolymerization or random copolymerization, and the term "copolymer" may indicate a block copolymer or a random copolymer.

Figure 2:
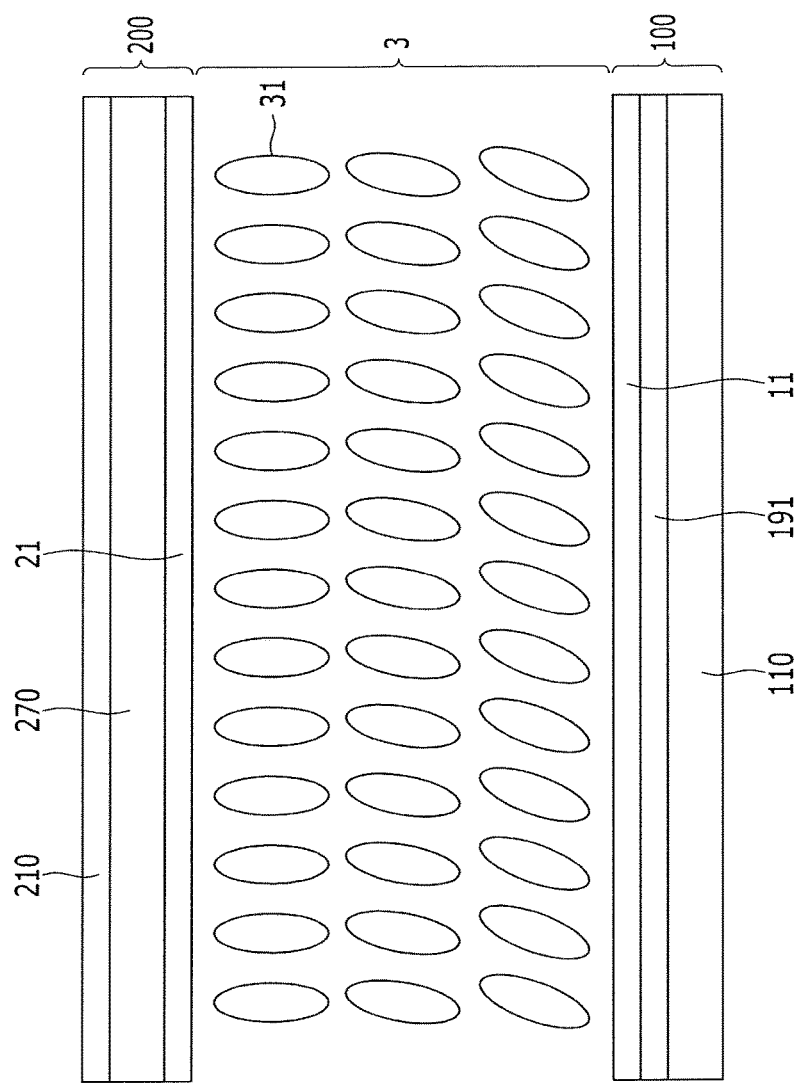
FIG. 2 is a cross-sectional view partially illustrating constituent elements of a liquid crystal display according to an exemplary embodiment of the present invention.

Hereinafter, a liquid crystal display according to an exemplary embodiment of the present invention will be described in more detail with reference to FIG. 1 and FIG. 2. FIG. 1 is a perspective view of a liquid crystal display according to an exemplary embodiment of the present invention. FIG. 2 is a cross-sectional view partially illustrating constituent elements of a liquid crystal display according to an exemplary embodiment of the present invention.

Referring to FIG. 1, a liquid crystal display 10 according to an exemplary embodiment of the present invention may be a curved liquid crystal display. The liquid crystal display 10 may be curved in a long axis direction (e.g., a horizontal direction), or may be curved in a short axis direction (e.g., a vertical direction). The curved liquid crystal display 10 which may be curved in the long axis direction will be described in more detail below. However, exemplary embodiments of the present invention are not limited thereto. Exemplary embodiments of the present invention may include a flat-type display device.

Referring to FIG. 2, a lower display panel 100 of the liquid crystal display 10 according to an exemplary embodiment of the present invention may include a pixel electrode 191 disposed on a first insulation substrate 110, and a first alignment layer 11 disposed on the pixel electrode 191. Liquid crystal molecules 31 disposed adjacent to the first alignment layer 11 may have a pre-tilt angle. The pre-tilt refers to the obliqueness with respect to a direction substantially perpendicular to the surface of the first alignment layer 11 or the second alignment layer 21.

An upper display panel 200 may include a second insulation substrate 210 facing the first insulation substrate 110, a common electrode 270 disposed on a surface of the second insulation substrate 210 facing the first insulation substrate, and a second alignment layer 21 disposed on a surface of the common electrode 270 facing the first insulation substrate. Liquid crystal molecules 31 disposed adjacent to the second alignment layer 21 may have no pre-tilt angle, and may be aligned to be substantially perpendicular with respect to the substrate 210. A liquid crystal layer 3 may be disposed between the lower display panel 100 and the upper display panel 200.

The liquid crystal display 10 including the first alignment layer 11 and the second alignment layer 12 may reduce or prevent an occurrence of texture due to misalignment of the liquid crystal molecules 31 caused by the upper display panel 200 having no pre-tilt with respect to the lower display panel 100 and may control the reduction in transmittance, even when misalignment is generated between the upper display panel 200 and the lower display panel 100 due to the display device which is curved.

Hereinafter, the first alignment layer 11 and the second alignment layer 21 will be described in more detail. The first and second alignment layers 11 and 21 may include different liquid crystal alignment agents, and may include a main chain and a side chain connected to the main chain.

The first alignment layer 11 may include a first structural unit represented by Chemical Formula 1 and a second structural unit represented by Chemical Formula 2.

[Chemical Formula 1]

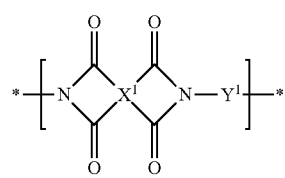

-continued

[Chemical Formula 2]

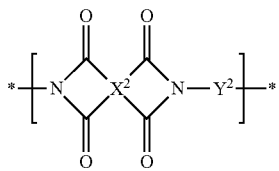

According to an exemplary embodiment of the present invention, in Chemical Formulae 1 to 2, $X^1$ and $X^2$ are independently a tetravalent organic group derived from an alicyclic acid dianhydride or an aromatic acid dianhydride, and $Y^1$ is a divalent organic group derived from an aromatic diamine. At least one hydrogen of the divalent organic group is substituted by Chemical Formula 1A. $Y^2$ is a divalent organic group derived from an aromatic diamine, and at least one hydrogen of the divalent organic group is substituted by Chemical Formula 2A or Chemical Formula 2B.

[Chemical Formula 1A]

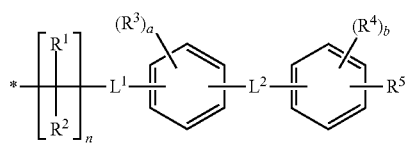

According to an exemplary embodiment of the present invention, in Chemical Formula 1A, $R^1$ to $R^4$ are independently hydrogen or a substituted or unsubstituted C1 to C8 alkyl group, and n is an integer that is in a range of 3 to 20. $R^5$ is a substituted or unsubstituted C1 to C30 alkyl group. "a" and "b" are independently an integer between 0 to 4, and D and $L^2$ are independently a single bond, —O—, —S($=$O)$_2$—, or —(C($R^x$) ($R^y$))$_m$—. $R^x$ and $R^y$ may each independently be a hydrogen atom or a substituted or unsubstituted C1 to C8 alkyl group, and m may be an integer that is in a range of 1 to 20.

$Y^1$ is a divalent organic group derived from the aromatic diamine. When at least one hydrogen of the divalent organic group is substituted by Chemical Formula 1A, Chemical Formula 1A may function like a vertical alignment group vertically aligning the liquid crystal molecule 31 adjacent to the alignment layer.

[Chemical Formula 2A]

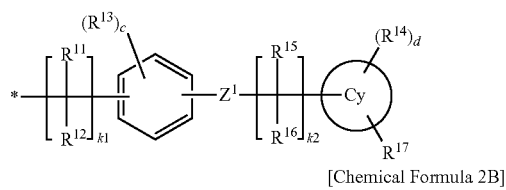

[Chemical Formula 2B]

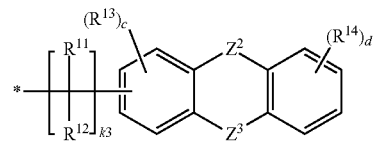

According to an exemplary embodiment of the present invention, in Chemical Formula 2A and Chemical Formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, "c" and "d" are independently integers between 0 to 4, k1 and k3 are an integer between 3 to 20, k2 is an integer between 0 to 5, $Z^1$ and $Z^2$ are independently —C($=$O)—, and $Z^3$ is —S— or —C($=$O)—.

The second structural unit represented by Chemical Formula 2 may include at least one of a benzophenone group, an acetophenone group, a benzoin ether group, and a benzyl group. The substituents may serve as radical anions to attract ion impurities, such as positive ion impurities, included in the liquid crystal layer 3.

The second structural unit represented by Chemical Formula 2 may serve as a photo-reactive group or a photo-reactive derivative and may be reacted with a reactive mesogen (RM) included in the liquid crystal layer 3. The reactive mesogen combined by the reaction may be coupled to the first alignment layer 11 as an alignment polymer, and thus liquid crystal molecules 31 disposed adjacent to the first alignment layer 11 may have a pre-tilt angle.

The liquid crystal molecules 31 may be injected between the first insulation substrate 110 and the second insulation substrate 210. After the liquid crystal molecules 31 are injected between the first insulation substrate 110 and the second insulation substrate 210, if a voltage is applied and ultraviolet rays (UV) are radiated to the liquid crystal molecules 31, the substituent represented by Chemical Formula 2A or Chemical Formula 2B may generate a radical and may be reacted with the reactive mesogen in the liquid crystal layer 3 to be combined. That is, the reactive mesogen may be reacted with Chemical Formula 2A or 2B to be coupled to the first alignment layer 11 as the alignment polymer.

The second alignment layer 21 may include the first structural unit represented by Chemical Formula 1 and a third structural unit represented by Chemical Formula 3.

[Chemical Formula 1]

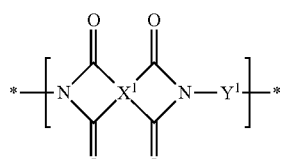

[Chemical Formula 3]

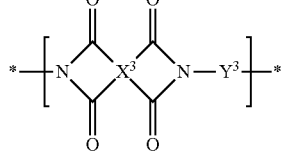

According to an exemplary embodiment of the present invention, in Chemical Formulae 1 and 3, $X^1$ and $X^3$ are independently a tetravalent organic group derived from an alicyclic acid dianhydride or an aromatic acid dianhydride, $Y^1$ is a divalent organic group derived from an aromatic diamine, and at least one hydrogen of the divalent organic group is substituted by Chemical Formula 1A.

[Chemical Formula 1A]

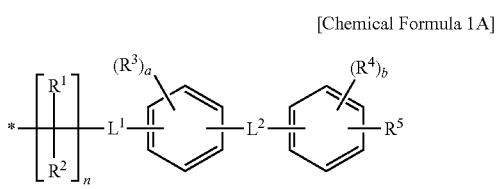

According to an exemplary embodiment of the present invention, in Chemical Formula 1A, $R^1$ to $R^4$ are independently hydrogen or a substituted or unsubstituted C1 to C8 alkyl group, and n is an integer that is in a range of 3 to 20. $R^5$ is a substituted or unsubstituted C1 to C30 alkyl group. "a" and "b" are independently integers that are in a range of 0 to 4, and $L^1$ and $L^2$ are independently a single bond, —O—, —S(=O)$_2$—, or —(C($R_y$)($R^y$))$_m$—. $R^x$ and $R^y$ are independently hydrogen atoms or a substituted or unsubstituted C1 to C8 alkyl group, and m is an integer that is in a range of 1 to 20.

According to an exemplary embodiment of the present invention, in Chemical Formula 3, $Y^3$ is a divalent organic group derived from the aromatic diamine, and at least one hydrogen of the divalent organic group substituted by a substituted or unsubstituted C5 to C30 straight chain or a branched chain alkyl group (e.g., CH$_2$ groups that are not adjacent to each other in the alkyl group may be substituted by —O—, —N($R^a$)—, —C(=O)O—, —C(=O)N($R^b$)—, —N($R^c$)C(=O)—, or —OC(=O)—, and $R^a$, $R^b$, and $R^c$ are independently hydrogen or a substituted or unsubstituted C1 to C8 alkyl group). The third structural unit represented by Chemical Formula 3 may include at least one of a pyridine group, a pyrimidine group, an indole group, a furan group, and a quinoline group. An electronegativity difference between carbon atoms and nitrogen atoms included in the substituent such as the pyridine group may generate a dipole moment in the substituent, and the second alignment layer 21 including the third structural unit represented by Chemical Formula 3 may attract ion impurities, such as positive ion impurities, included in the liquid crystal layer 3. That is, the third structural unit represented by Chemical Formula 3 may be an ion inductor.

The second alignment layer 21 according to an exemplary embodiment of the present invention might not include the second structural unit represented by Chemical Formula 2 which serves as the photo-reactive group, and may vertically align the liquid crystal molecules 31 disposed adjacent to the second alignment layer 21 through the first structural unit represented by Chemical Formula 1 which has a vertical alignment function. That is, the liquid crystal molecules 31 disposed adjacent to the second alignment layer 21 might have no pre-tilt angle.

The liquid crystal alignment agent forming the first alignment layer 11 and the second alignment layer 21 according to an exemplary embodiment of the present invention may include a polyimide. The polyimide may copolymerize at least one acid dianhydride selected from an alicyclic acid dianhydride, an aromatic acid dianhydride, and an aromatic diamine, to manufacture the polyamic acid and to be imidized. The manufacturing method of the polyamic acid is not limited to known methods used for the synthesis of the polyamic acid.

The alicyclic acid dianhydride may include at least one selected from 1,2,3,4-cyclobutanetetracarboxylic acid dianhydride (CBDA), 2,3,4,5-tetrahydrofurantetracarboxylic acid dianhydride, 5-(2,5-dioxotetrahydrofuryl)-3-methylcyclohexene-1,2-dicarboxylic acid anhydride (DOCDA), bicyclooctene-2,3,5,6-tetracarboxylic acid dianhydride (BODA), 1,2,3,4-cyclopentanetetracarboxylic acid dianhydride (CPDA), 1,2,4,5-cyclohexanetetracarboxylic acid dianhydride (CHDA), 1,2,4-tricarboxy-3-methylcarboxy cyclopentane dianhydride, 1,2,3,4-tetracarboxy cyclopentane dianhydride, 3,4-dicarboxy-1-cyclohexyl succinicacid dianhydride, 3,4-dicarboxy-1,2,3,4-tetrahydro-1-naphthalene succinic acid dianhydride, and 2,3,5-tricarboxycyclopentyl acetate acid dianhydride (2,3,5-tricarboxycyclopentyl acetic acid dianhydride, TCA-AH), but exemplary embodiments of the present invention are not limited thereto.

The aromatic acid dianhydride may include at least one selected from pyromellitic acid dianhydride (PMDA), biphthalic acid anhydride (BPDA), oxydiphthalic acid dianhydride (ODPA), benzophenonetetracarboxylic acid dianhydride (BTDA), and hexafluoroisopropylidene diphthalic dianhydride (6-FDA), but exemplary embodiments of the present invention are not limited thereto.

The liquid crystal alignment agent forming the first alignment layer 11 and the second alignment layer 21 may include a solvent. By including the solvent, the liquid crystal alignment agent may have relatively high spreadability and adhesiveness with the substrate may be obtained.

Examples of the solvent according to exemplary embodiments of the present invention include N-methyl-2-pyrrolidone; N,N-dimethyl acetamide; N,N-dimethyl formamide; dimethyl sulfoxide; γ-butyrolactone; tetrahydrofuran (THF); and a phenol-based solvent such as meta-cresols, phenols, and halogenated phenols, but exemplary embodiments of the present invention are not limited thereto.

The solvent may include 2-butyl cellosolve (2-BC), which may increase printability. The 2-butyl cellosolve may be included at 1 to about 50 wt % of the total content of the solvent including the 2-butyl cellosolve, and more specifically, may be included at about 10 to about 40 wt % of the total content of the solvent including the 2-butyl cellosolve. When the 2-butyl cellosolve is included in such a range, the printability may be increased.

The solvent may include alcohol series, ketone series, ester series, ether series, hydrogen carbon series, or halogenated hydrogen carbon series as a poor solvent with a concentration in a range such in which a soluble polyimide polymer is not precipitated. The poor solvents may reduce a surface energy of the liquid crystal alignment agent, and may increase the spreadability and flatness of a coating.

The poor solvent may be included at 1 to about 90 wt % of the total content of the solvent including the poor solvent, and more specifically, may be included at 1 to about 70 wt % of the total content of the solvent including the poor solvent.

An example of the poor solvent according to an exemplary embodiment of the present invention may include one selected from methanol, ethanol, isopropanol, cyclohexanol, ethylene glycol, propylene glycol, 1,4-butanediol, triethylene glycol, acetone, methylethyl ketone, cyclo hexanone, methylacetate, ethylacetate, butyl acetate, diethyloxalate, malonate ester, diethylether, ethylene glycol monomethylether, ethylene glycol dimethylether, ethylene glycol monoethylether, ethylene glycol phenylether, ethylene glycol phenylmethylether, ethylene glycol phenylethylether, diethylene glycol dimethylether, diethyleneglycol ether, diethylene glycol monomethylether, diethylene glycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, trichloroethane, chlorobenzene, o-dichlorobenzene, hexane, heptane, octane, benzene, toluene, xylene, and combinations thereof.

The liquid crystal alignment agent for forming the first alignment layer 11 and the second alignment layer 21 may include other additives.

The other additives may include an epoxy compound. The epoxy compound may be used to increase the reliability and an electro-optical characteristic. The epoxy compound may include at least one epoxy compound including 2 to 8 epoxy groups, and more specifically, 2 to 4 epoxy groups.

The epoxy compound may be included at 0.1 to about 50 parts by weight of the polyimide, and more specifically, may be included at 1 to about 30 parts by weight of the polyimide. When the epoxy compound is included in the above range, while showing printability and flatness on the coating on the substrate, the reliability and the electro-optical characteristic may be increased.

Specific examples of the epoxy compound according to an exemplary embodiment of the present invention include N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycolglycidylether, polyethyleneglycolglycidylether, propyleneglycolglycidylether, tripropyleneglycolglycidylether, polypropyleneglycolglycidylether, neopentylglycolglycidylether, 1,6-hexane dioldiglycidylether, glycerin diglycidylether, 2,2-dibromoneopentylglycolglycidylether, 1,3,5,6-tetraglycidyl-2,4-hexane diol, N,N,N',N'-tetraglycidyl-1,4-phenylene diamine, N,N,N',N'-tetraglycidyl-m-xylene diamine, N,N,N',N'-tetraglycidyl-2,2'-dimethyl-4,4'-diaminobiphenyl, 2,2-bis [4-(N,N-diglycidyl-4-aminophenoxy)phenyl]propane, N,N,N',N'-tetraglycidyl-4,4'-diaminodi phenylmethane, 1,3-bis(N,N-diglycidylaminomethyl)cyclohexane, and 1,3-bis(N,N-diglycidylaminomethyl)benzene, but exemplary embodiments of the present invention are not limited thereto.

To increase the printability, a surfactant or a coupling agent may be included in the liquid crystal alignment agent.

The first and second liquid crystal alignment layers 11 and 21 may be formed by coating the liquid crystal alignment agent on the substrate. A method of coating the liquid crystal alignment agent on the substrate may include a spin coating method, a flexo printing method, and an inkjet method. The flexo printing method may provide relatively high uniformity of the coated layer and a relatively large sized coating layer may be formed.

To increase the uniformity of the coated layer, after the liquid crystal alignment agent is uniformly coated on the substrate, pre-drying may be performed at a temperature from room temperature to about 200° C., and more specifically, at a temperature of from about 30° C. to about 150° C., and even more specifically, at a temperature of from about 40° C. to about 120° C., for a duration of 1 minute to about 100 minutes. Through the pre-drying, by adjusting the volatility of each component of the liquid crystal alignment agent, a uniformly coated layer without a deviation may be obtained.

Next, firing may be performed at a temperature of from about 80° C. to about 300° C., specifically at a temperature of from about 120° C. to about 280° C., for a duration of about 5 minutes to about 300 minutes to evaporate the solvent. Thus, the alignment layers 11 and 21 may be formed.

The first alignment layer 11 may include the vertical alignment group (e.g., the vertical alignment group included in the first structural unit represented by Chemical Formula 1 as the side chain) and the photo-reactive group (e.g., the photo reactive group included in the second structural unit represented by Chemical Formula 2 as the side chain), and the liquid crystal molecules 31 adjacent to the first alignment layer may have the pre-tilt angle due to the alignment polymer in which the photo-reactive group and the reactive mesogen are combined according to the manufacturing process according to an exemplary embodiment of the present invention.

The second alignment layer 21 may include the vertical alignment group (e.g., the vertical alignment group included in the first structural unit represented by Chemical Formula 1 as the side chain) and the ion inductor (e.g., the ion inductor included in the third structural unit represented by Chemical Formula 3 as the side chain), and thus liquid crystal molecules 31 disposed adjacent to the second alignment layer 21 may be vertically aligned by the vertical alignment group.

In accordance with the liquid crystal display including liquid crystal molecules 31 of which the pre-tilt angle is changed according to the first alignment layer 11 and the second alignment layer 12, although the upper and lower display panels 200 and 100 may be misaligned, the arrangement directions of the liquid crystal molecules 31 adjacent to the first alignment layer 11 and the liquid crystal molecules 31 adjacent to the second alignment layer 21 may be reduced or prevented Thus, an occurrence of the texture generation may be reduced or prevented.

The liquid crystal display according to an exemplary embodiment of the present invention may include the first and second alignment layers 11 and 21 including a substituent such as the benzophenone group included in the second structural unit represented by Chemical Formula 2 of the first alignment layer 11 and a substituent such as the pyridine group included in the third structural unit represented by Chemical Formula 3 of the second alignment layer 21 for attracting ion impurities included in the liquid crystal layer 3.

Accordingly, an occurrence of afterimages may be reduced or prevented and the display quality may be increased by preventing ion impurities from being accumulated in a side of the first alignment layer 11 or the second alignment layer 21.

The first alignment layer 11 according to an exemplary embodiment of the present invention may include the third structural unit represented by Chemical Formula 3. That is, the first alignment layer 11 may include an ion inductor.

The first alignment layer 11 according to an exemplary embodiment of the present invention may include the first structural unit represented by Chemical Formula 1, the second structural unit represented by Chemical Formula 2, and the third structural unit represented by Chemical Formula 3. Accordingly, the first alignment layer 11 may include the vertical alignment group, the photo-reactive group or the photo-reactive derivative, and the ion inductor.

The second alignment layer 21 according to an exemplary embodiment of the present invention may be substantially the same as the second alignment layer 21 according to the exemplary embodiments of the present invention described above.

According to an exemplary embodiment of the present invention, both of the first alignment layer 11 and the second alignment layer 21 may include the ion inductor, and thus the ion impurities included in the liquid crystal layer 3 may be guided to the upper display panel 200 and the lower display panel 100. Accordingly, an occurrence of afterimages due to the ion impurities accumulated at a side of the liquid crystal display may be reduced or prevented.

According to a manufacturing process of the display device according to an exemplary embodiment of the present invention, when a laser irradiates some pixels with light, halogen ions or radicals may be generated at color filters. These impurities such as the halogen ions or the radicals may be coupled to the ion inductor included in the first and second alignment layers 11 and 21, and thus the alignment layers 11 and 21 according to an exemplary embodiment of the present invention may control defective pixels generated due to the halogen ions or the radicals.

Figure 3:
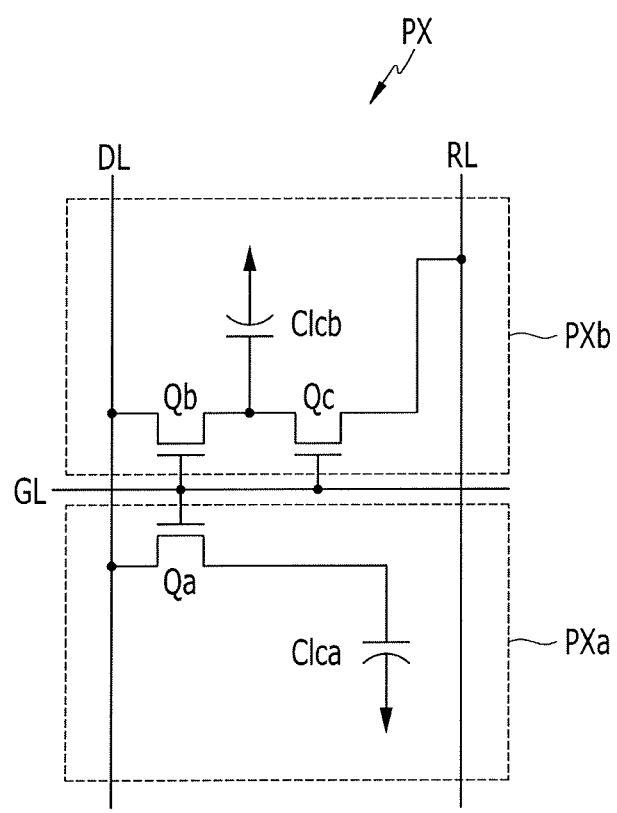
FIG. 3 is a circuit diagram of one pixel according to an exemplary embodiment of the present invention.
Figure 4:
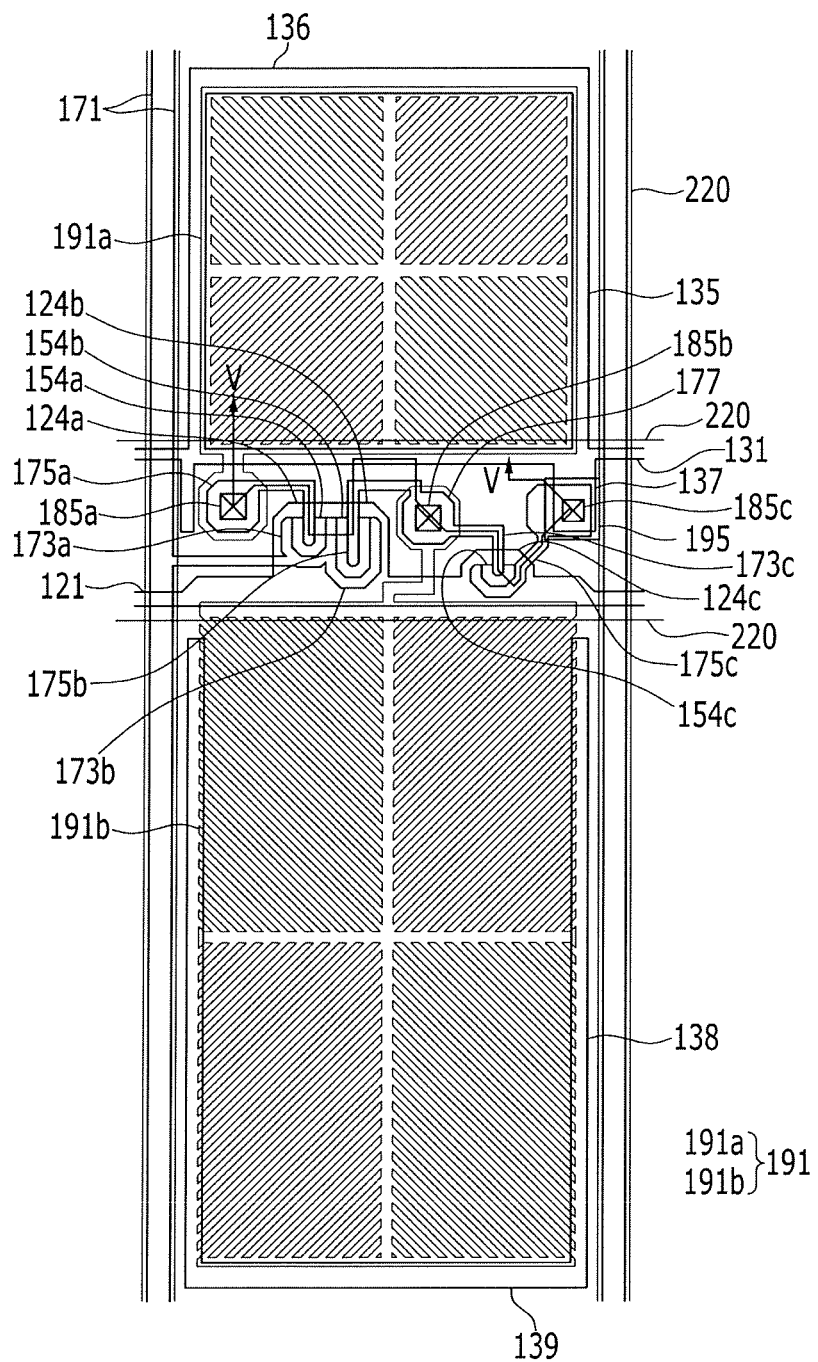
FIG. 4 is a plan layout of one pixel according to an exemplary embodiment of the present invention.
Figure 5:
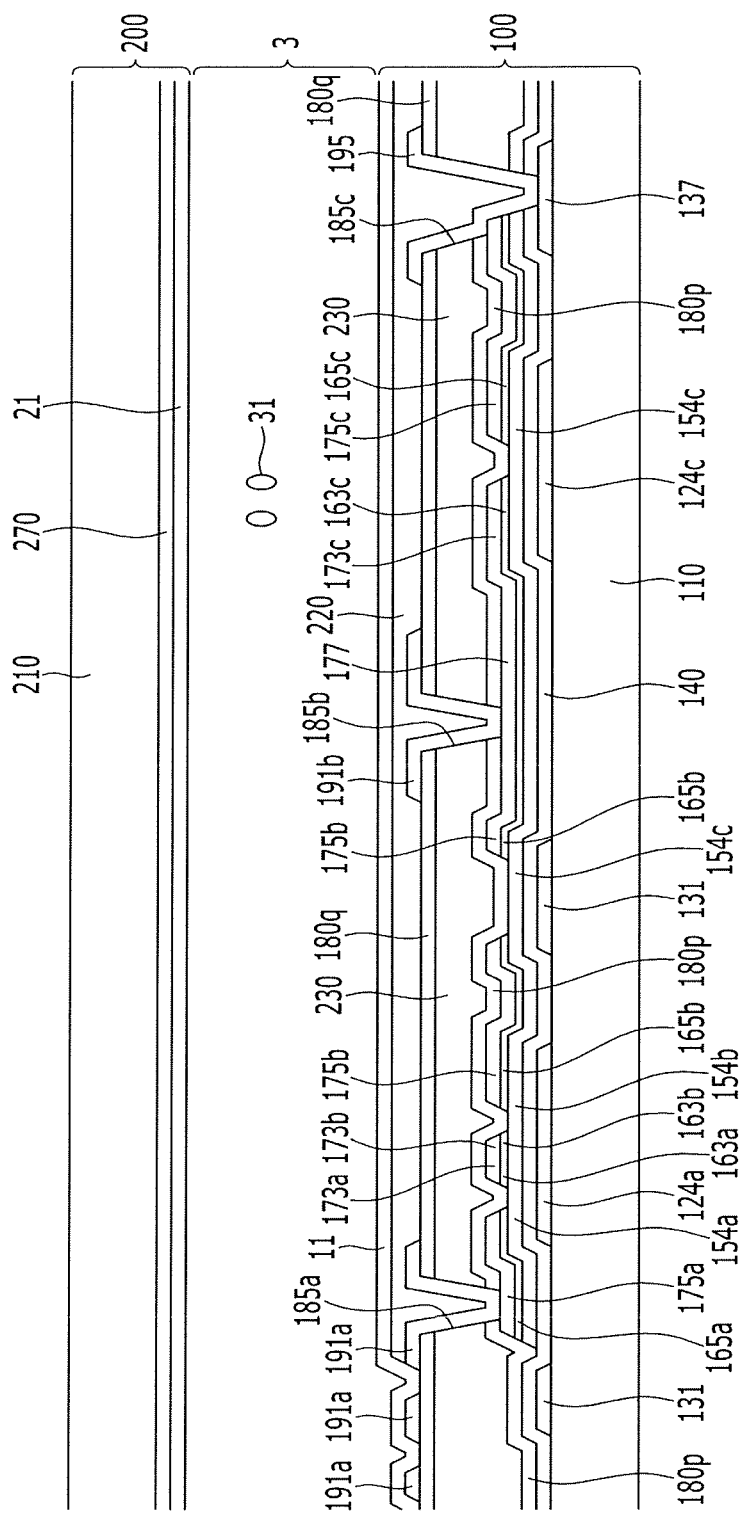
FIG. 5 is a cross-sectional view taken along a line V-V of FIG. 4.
Figure 6:
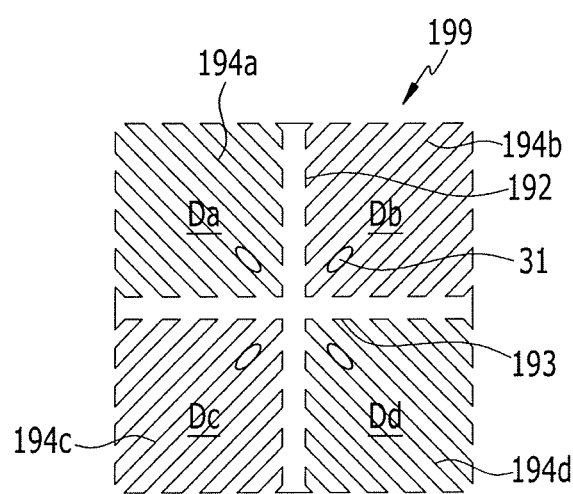
FIG. 6 is a top plan view of a pixel according to an exemplary embodiment of the present invention.

Hereinafter, a liquid crystal display according to an exemplary embodiment of the present invention will be described in more detail with reference to FIG. 3 to FIG. 6. FIG. 3 is a circuit diagram of one pixel according to an exemplary embodiment of the present invention. FIG. 4 is a plan layout of one pixel according to an exemplary embodiment of the present invention. FIG. 5 is a cross-sectional view taken along a line V-V of FIG. 4. FIG. 6 is a top plan view of a pixel according to an exemplary embodiment of the present invention.

Referring to FIG. 3, one pixel PX (e.g., the pixel PX including a first sub-pixel electrode PXa and a second sub-pixel electrode PXb) of the liquid crystal display according to an exemplary embodiment of the present invention may include a plurality of signal lines including a gate line GL transferring a gate signal, a data line DL transferring a data signal, and a divided reference voltage line RL transferring a divided voltage reference voltage. The one pixel PX may include first, second, and third switching elements Qa, Qb, and Qc, and first and second liquid crystal capacitors Clca and Clcb connected to the plurality of signal lines.

The first and second switching elements Qa and Qb may be connected to the gate line GL and the data line DL, respectively, and the third switching element Qc may be connected to an output terminal of the second switching element Qb and the divided reference voltage line RL.

The first switching element Qa and the second switching element Qb may each be three-terminal elements such as a thin film transistor. A control terminal is connected to the gate line GL, an input terminal of each of the first switching element Qa and the second switching element Qb may be connected to the data line DL, an output terminal of the first switching element Qa may be connected to the first liquid crystal capacitor Clca, and the output terminal of the second switching element Qb may be connected to the second liquid crystal capacitor Clcb and an input terminal of the third switching element Qc.

The third switching element Qc may be the three-terminal element such as the thin film transistor. The control terminal of the third switching element Qc may be connected to the gate line GL. The input terminal of the third switching element Qc may be connected to the second liquid crystal capacitor Clcb, and an output terminal of the third switching element Qc may be connected to the divided reference voltage line RL.

If a gate-on signal is applied to the gate line GL, the first switching element Qa, the second switching element Qb, and the third switching element Qc connected to the gate line GL may be turned on. Accordingly, the data voltage applied to the data line DL may be applied to the first sub-pixel electrode Pxa and the second sub-pixel electrode PXb through the first switching element Qa and the second switching element Qb that are turned on. The data voltages applied to the first sub-pixel electrode PXa and the second sub-pixel electrode PXb may be the same as each other, and the first liquid crystal capacitor Clca and the second liquid crystal capacitor Clcb may be charged by the same value as a difference between the common voltage and the data voltage. Substantially simultaneously, the voltage charged in the second liquid crystal capacitor Clcb may be divided through the turned-on third switching element Qc. Accordingly, a value of the voltage charged in the second liquid crystal capacitor Clcb may be reduced by a difference between the common voltage and the divided voltage reference voltage. That is, the voltage charged in the first liquid crystal capacitor Clca may become higher than the voltage charged in the second liquid crystal capacitor Clcb.

Accordingly, the voltage charged in the first liquid crystal capacitor Clca may be different from the voltage charged in the second liquid crystal capacitor Clcb. Since the voltage of the first liquid crystal capacitor Clca and the voltage of the second liquid crystal capacitor Clcb may be different from each other, inclination angles of liquid crystal molecules 31 in a first sub-pixel and a second sub-pixel become different from each other, and thus luminances of the two sub-pixels become different from each other. Accordingly, if the voltage of the first liquid crystal capacitor Clca and the voltage of the second liquid crystal capacitor Clcb are adjusted, an image viewed in a lateral surface may be substantially the same as an image viewed in a front, and thus lateral surface visibility may be increased.

According to an exemplary embodiment of the present invention, to make the voltage charged in the first liquid crystal capacitor Clca and the voltage charged in the second liquid crystal capacitor Clcb different, the third switching element Qc connected to the second liquid crystal capacitor Clcb and the divided reference voltage line RL may be included. In the liquid crystal display according to another exemplary embodiment of the present invention, the second liquid crystal capacitor Clcb may be connected to a step-down capacitor.

The third switching element including a first terminal connected to a step-down gate line, a second terminal connected to the second liquid crystal capacitor Clcb, and a third terminal connected to a step-down capacitor may charge a portion of an amount of electric charges charged in the second liquid crystal capacitor Clcb in the step-down capacitor, and thus charge voltages between the first liquid crystal capacitor Clca and the second liquid crystal capacitor Clcb may be set to be different from each other. In the liquid crystal display according to an exemplary embodiment of the present invention, the first liquid crystal capacitor Clca and the second liquid crystal capacitor Clcb may be connected to different data lines to receive different data voltages, and thus charge voltages between the first liquid crystal capacitor Clca and the second liquid crystal capacitor Clcb may be set to be different from each other. The charge voltages between the first liquid crystal capacitor Clca and the second liquid crystal capacitor Clcb may be set to be different from each other by various methods.

First, referring to FIG. 4 and FIG. 5, the liquid crystal display according to an exemplary embodiment of the present invention may include a lower display panel 100 and an upper display panel 200 facing each other. A liquid crystal layer 3 may be disposed between the two display panels 100 and 200, and polarizer may be disposed on outer surfaces of each of the display panels 100 and 200.

The lower display panel 100 will be described below in more detail.

A gate conductor including a gate line 121 and a divided reference voltage line 131 may be disposed on an insulating substrate 110. The insulating substrate 110 may include transparent glass or plastics.

The gate line 121 may include a first gate electrode 124a, a second gate electrode 124b, a third gate electrode 124c, and a wide end portion which may connect to another layer or an external driving circuit.

The divided reference voltage line 131 may include first storage electrodes 135 and 136 and a reference electrode 137. Second storage electrodes 138 and 139 may be included which are not connected to the divided reference voltage line 131 but overlap a second sub-pixel electrode 191b.

A gate insulating layer 140 may be disposed on the gate line 121 and the divided reference voltage line 131.

A first semiconductor layer 154a, a second semiconductor layer 154b, and a third semiconductor layer 154c may be disposed on the gate insulating layer 140. A plurality of ohmic contacts 163a, 165a, 163b, 165b, 163c, and 165c may be disposed on the semiconductor layers 154a, 154b, and 154c. The ohmic contacts may be omitted according to an exemplary embodiment of the present invention.

A plurality of data lines 171 including a first source electrode 173a and a second source electrode 173b, and data conductors including a first drain electrode 175a, a second drain electrode 175b, a third source electrode 173c, and a third drain electrode 175c may be disposed on the ohmic contacts 163a, 165a, 163b, 165b, 163c, and 165c and the gate insulating layer 140.

The data conductors, the semiconductors disposed under the data conductors, and the ohmic contacts may be simultaneously formed using a single mask.

The data line 171 may include a wide end portion which may connect to another layer or an external driving circuit.

The first gate electrode 124a, the first source electrode 173a, and the first drain electrode 175a may form the first thin film transistor Qa along with the first semiconductor layer 154a, and a channel of the first thin film transistor Qa may be disposed at the first semiconductor layer 154a between the first source electrode 173a and the first drain electrode 175a. Similarly, the second gate electrode 124b, the second source electrode 173b, and the second drain electrode 175b may form the second thin film transistor Qb along with the second semiconductor layer 154b, and a channel of the second thin film transistor Qb may be disposed at the second semiconductor layer 154b between the second source electrode 173b and the second drain electrode 175b. The third gate electrode 124c, the third source electrode 173c, and the third drain electrode 175c may form the third thin film transistor Qc along with the third semiconductor layer 154c, and a channel of the third thin film transistor Qc may be disposed at the third semiconductor layer 154c between the third source electrode 173c and the third drain electrode 175c.

The second drain electrode 175b may be connected to the third source electrode 173c and may be connected to the pixel electrode through a wide expansion 177.

A first passivation layer 180p may be disposed on the data conductors 171, 173c, 175a, 175b, and 175c and the exposed semiconductors layers 154a, 154b, and 154c. The first passivation layer 180p may include an inorganic insulating layer including a silicon nitride or a silicon oxide. The first passivation layer 180p may reduce or prevent a pigment of a color filter 230 from flowing into the exposed semiconductor layers 154a, 154b, and 154c.

The color filter 230 may be disposed on the first passivation layer 180p. The color filter 230 may extend in a vertical direction along two adjacent data lines. A light blocking member 220 may be disposed on the first passivation layer 180p, an edge of the color filter 230, and the data line 171.

The light blocking member 220 may extend along the data line 171, and may be disposed between two adjacent color filters 230. A width of the light blocking member 220 may be wider than a width of the data line 171. The width of the light blocking member 220 may be wider than the width of the data line 171. The light blocking member 220 may reduce or prevent light incident from the outside from being reflected from a surface of the data line 171, which may be a metal data line. Light reflected from the surface of the data line 171 may interfere with light passing through the liquid crystal layer 3, which may reduce or prevent a contrast ratio of the liquid crystal display from being decreased. Exemplary embodiments of the present invention are described in which the light blocking member 220 is disposed in exemplary locations, however exemplary embodiments of the present invention are not limited thereto, and a shielding electrode (not shown) which may be disposed in the same layer as the pixel electrode may replace the light blocking member 220.

The light blocking member 220 may cover the first transistor Qa, the second transistor Qb, and the third transistor Qc, and may extend in the same direction as the gate line 121 to overlap a portion of the data line 171. The light blocking member 220 may overlap at least a portion of two data lines 171 disposed at both sides of one pixel area to prevent light leakage generated near the data line 171 and the gate line 121. Light leakage may be reduced or prevented in the region where the first transistor Qa, the second transistor Qb, and the third transistor Qc are disposed.

A second passivation layer 180q may be disposed on the color filter 230 and the light blocking member 220.

The second passivation layer 180q may include an inorganic insulating layer that is formed of a silicon nitride or a silicon oxide. The second passivation layer 180q may reduce or prevent peeling of the color filter 230, and may reduce or prevent contamination of the liquid crystal layer 3 by an organic material such as a solvent flowing from the color filter 230 and may reduce or prevent defects such as afterimages that may occur when an image is driven.

One of the first passivation layer 180p and the second passivation layer 180q may be omitted.

A first contact hole 185a and a second contact hole 185b may be disposed in the first and second passivation layers 180p and 180q to expose the first and second drain electrodes 175a and 175b, respectively.

A third contact hole 185c may be disposed in the first passivation layer 180p, the second passivation layer 180q, and the gate insulating layer 140 to partially expose the reference electrode 137 and the third drain electrode 175c. The third contact hole 185c may be covered with a connecting member 195. The connecting member 195 may electrically connect the reference electrode 137 and the third drain electrode 175c that are exposed through the third contact hole 185c.

A plurality of pixel electrodes 191 may be disposed on the second passivation layer 180q. Each pixel electrode 191 may include a first subpixel electrode 191a and a second subpixel electrode 191b which may be separated from each other. The gate line 121 may be disposed between the pixel electrodes 191. The pixel electrodes 191 may be adjacent in a column direction based on the gate line 121.

The pixel electrode 191 may include a transparent material such as ITO or IZO. The pixel electrode 191 may include a transparent conductive material such as ITO or IZO, or a reflective metal such as aluminum, silver, chromium, or an alloy thereof.

Each of the first subpixel electrode 191a and the second subpixel electrode 191b may include one or more basic electrode 199 illustrated in FIG. 6, or a modification of the basic electrode 199.

The first sub-pixel electrode 191a and the second sub-pixel electrode 191b may be physically and electrically connected through the first contact hole 185a and the second contact hole 185b to the first drain electrode 175a and the second drain electrode 175b, respectively. The first sub-pixel electrode 191a and the second sub-pixel electrode 191b may receive a data voltage from the first drain electrode 175a and the second drain electrode 175b. Some of the data voltage applied to the second drain electrode 175b may be divided through the third source electrode 173c, and thus a size of the voltage applied to the first subpixel electrode 191a may be larger than that of the voltage applied to the second subpixel electrode 191b.

The first subpixel electrode 191a and the second sub-pixel electrode 191b to which the data voltage is applied may generate an electric field together with a common electrode 270 of the upper display panel 200 to determine a direction of the liquid crystal molecules 31 of the liquid crystal layer 3 between the pixel electrode 191 and the common electrode 270. The luminance of light passing through the liquid crystal layer 3 may be changed according to the direction of the liquid crystal molecules 31.

The first passivation layer 180p, the color filter 230, and the second passivation layer 180q may be disposed in the region where the first transistor Qa, the second transistor Qb, the third transistor Qc, and the first to third contact holes 185a, 185b, and 185c are disposed, thus distinguishing positions of the first transistor Qa, the second transistor Qb, the third transistor Qc, and the first to third contact holes 185a, 185b, and 185c.

The first alignment layer 11 may be disposed on the pixel electrode 191. The first alignment layer 11 may be substantially the same as the first alignment layer 11 according to the above-described exemplary embodiment of the present invention.

The first alignment layer 11 may include the reactive mesogen (RM) combined by the UV radiation. That is, the reactive mesogen included in the liquid crystal layer 3 may be combined with the photo-reactive group by the UV radiation to form the alignment polymer. The reactive mesogen included in the first alignment layer 11 may pre-tilt the liquid crystal molecules 31 disposed adjacent to the first alignment layer 11.

The liquid crystal layer 3 may have a negative dielectric anisotropy, and liquid crystal molecules 31 of the liquid crystal layer 3 may be vertically aligned with respect to the surface of the two display panels 100 and 200.

The liquid crystal layer 3 may include the reactive mesogen. When the reactive mesogen is included in the first alignment layer 11 by UV radiation, a relatively small amount of the reactive mesogen may remain in the liquid crystal layer 3.

The upper display panel 200 will be described below in more detail.

The common electrode 270 may be disposed on a surface of the second insulation substrate 210, which the surface of the second insulation substrate 210 faces the first insulation substrate, and the second alignment layer 21 may be disposed on a surface of the common electrode 270 which the surface of the common electrode 270 faces the first insulation substrate. The second alignment layer 21 may include a same material as the second alignment layer 21 according to the exemplary embodiments of the present invention, and the liquid crystal molecules 31 adjacent to the second alignment layer 21 may be vertically aligned.

The basic electrode 199 will be described in more detail with reference to FIG. 6.

As shown in FIG. 6, the basic electrode 199 may have a quadrangular shape. The basic electrode 199 may include a cross-shaped stem including a horizontal stem 193 and a vertical stem 192 perpendicular to the horizontal stem 193. The basic electrode 199 may be divided into a first subregion Da, a second subregion Db, a third subregion Dc, and a fourth subregion Dd by the horizontal stem 193 and the vertical stem 192. Each subregion Da-Dd may include a plurality of first minute branches 194a, a plurality of second minute branches 194b, a plurality of third minute branches 194c and a plurality of fourth minute branches 194d.

The first minute branch 194a may obliquely extend from the transverse stem 193 or the longitudinal stem 192 in the upper-left direction. The second minute branch 194b may obliquely extend from the transverse stem 193 or the longitudinal stem 192 in the upper-right direction. The third minute branch 194c may obliquely extend from the transverse stem 193 or the longitudinal stem 192 in the lower-left direction. The fourth minute branch 194d may obliquely extend from the transverse stem 193 or the longitudinal stem 192 in the lower-right direction.

The first to fourth minute branches 194a, 194b, 194c, and 194d may form an angle of about 45° or about 135° with the gate lines 121a and 121b or the horizontal stem 193. The minute branches 194a, 194b, 194c, and 194d of two adjacent sub-regions of Da, Db, Dc, and Dd may be orthogonal to each other.

Widths of the minute branches 194a, 194b, 194c, and 194d may be from about 2.5 µm to about 5.0 µm, and a gap between the adjacent minute branches 194a, 194b, 194c, and 194d in one sub-region Da, Db, Dc, or Dd may be from about 2.5 µm to about 5.0 µm.

According to another exemplary embodiment of the present invention, the widths of the minute branches 194a, 194b, 194c, and 194d may be increased closer to the horizontal stem portion 193 or the vertical stem portion 192, and a difference between the largest width portion and the narrowest portion in one minute branch 194a, 194b, 194c, or 194d may be from about 0.2 µm to about 1.5 µm.

The first sub-pixel electrode 191a and the second sub-pixel electrode 191b may be connected through the first contact hole 185a and the second contact hole 185b to the first drain electrode 175a and the second drain electrode 175b, respectively, and may receive a data voltage from the first drain electrode 175a and the second drain electrode 175b. In this case, sides of the first to fourth minute branches 194a, 194b, 194c, and 194d may distort an electric field to generate a horizontal component determining an inclination direction of the liquid crystal molecules 31. The horizontal components of the electric field may be substantially horizontal with respect to the sides of the first to fourth minute branches 194a, 194b, 194c, and 194d. As illustrated in FIG. 1, the liquid crystal molecules 31 may be inclined in a direction that is parallel to longitudinal directions of the minute branches 194a, 194b, 194c, and 194d. Since one pixel electrode 191 may include the four subregions Da-Dd in which longitudinal directions of the minute branches 194a, 194b, 194c, and 194d are respectively different, the liquid crystal molecules 31 may be inclined in four directions such that four domains having different alignment directions of the liquid crystal molecules 31 may be formed in the liquid crystal layer 3. As described above, when the inclination directions of the liquid crystal molecules are diversified, a reference viewing angle of the liquid crystal display may be increased.

Hereinafter, a generation of defective pixels due to the alignment layers according to an exemplary embodiment of the present invention will be described in more detail with reference to FIG. 7.

Figure 7:
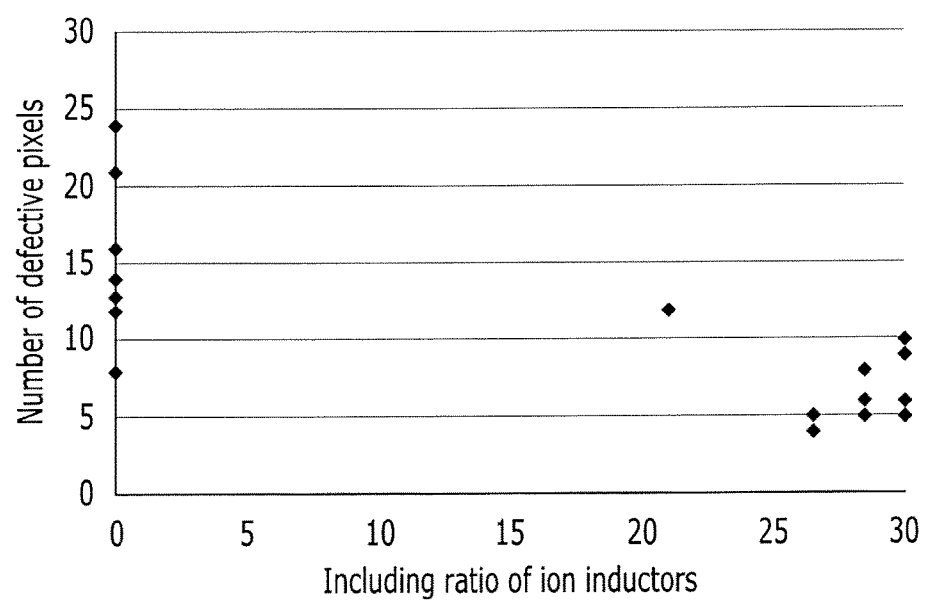
FIG. 7 is a graph illustrating generation of defective pixels in accordance with an inclusion ratio of ion inductors according to an exemplary embodiment of the present invention.

FIG. 7 is a graph illustrating generation of defective pixels in accordance with an inclusion ratio of ion inductors according to an exemplary embodiment of the present invention.

Referring to FIG. 7, according to an exemplary embodiment of the present invention, the number of defective pixels that is generated may be reduced or eliminated as a content of ion inductors included in the alignment layers (e.g. the first and second alignment layers 11 and 21) is increased. The ion inductors may be combined with halogen ions or radicals that cause the defect of pixels which may reduce or eliminate the generation of defective pixels.

According to an exemplary embodiment of the present invention, a difference of the voltages generated according to whether or not the inductors exist may be about 30 mV. This may indicate the reduction of afterimages formed due to charges accumulated at the second alignment layer 21 including the ion inductors.

In the liquid crystal display according to exemplary embodiments of the present invention, the liquid crystal molecules disposed adjacent to the first alignment layer may be pre-tilted, while the liquid crystal molecules disposed adjacent to the second alignment layer may be vertically arranged without being pretiled. Accordingly, even when the upper and lower display panels are misaligned due to being curved, there may be no alignment generated in the liquid crystal molecules, thus reducing or preventing a reduction in display quality and/or transmittance of the display device according to exemplary embodiments of the present invention.

Each alignment layer disposed in the upper and lower display panels may have a polarity to uniformly move ion impurities in the liquid crystal layer to the upper and lower display panels, thereby reducing or preventing a reduction in display quality due to charge accumulation.

While the present invention has been shown and described with reference to the exemplary embodiments thereof, it will be apparent to those of ordinary skill in the art that various changes in form and detail may be made thereto without departing from the spirit and scope of the present invention.

What is claimed is:
1. A curved liquid crystal display comprising:
a first insulation substrate;
a pixel electrode disposed on the first insulation substrate;
a first alignment layer disposed on the pixel electrode;
a second insulation substrate facing the first insulation substrate;
a common electrode disposed on a surface of the second insulation substrate, the surface of the second insulation substrate facing the first insulation substrate;
a second alignment layer disposed on a surface of the common electrode, the surface of the common electrode facing the first insulation substrate; and
a liquid crystal layer disposed between the first alignment layer and the second alignment layer, wherein the liquid crystal layer includes liquid crystal molecules,
wherein liquid crystal molecules adjacent to at least one of the first alignment layer and the second alignment layer have a pre-tilt angle,
the first alignment layer comprises at least one of a group of photo-reactive groups or photo-reactive derivatives, including at least one of a benzophenone group, an acetophenone group, a benzoin ether group, and a benzyl group,
the first alignment layer includes an alignment polymer, wherein a reactive mesogen (RM) and the photo-reactive group or the photo-reactive derivative, are coupled to the alignment polymer,
the second alignment layer comprises at least one of a group of ion inductors including at least one of a pyridine group, a pyrimidine group, an indole group, a furan group, and a quinoline group,
the first alignment layer and the second alignment layer comprise different materials from each other,
the first alignment layer and the second alignment layer attract ion impurities having a same polarity included in the liquid crystal layer, and
the liquid crystal molecules in the liquid crystal layer are inclined in four different directions when in the presence of an electric field.

2. The liquid crystal display of claim 1, wherein the first alignment layer and the second alignment layer each include a main chain and a side chain connected to the main chain.

3. The liquid crystal display of claim 2, wherein the side chain of the first alignment layer includes the photo-reactive group or the photo-reactive derivative.

4. The liquid crystal display of claim 2, wherein the at least one side chain of the second alignment layer does not include the photo-reactive group or the photo-reactive derivative.

5. The liquid crystal display of claim 2, wherein the side chain of the second alignment layer includes an ion inductor.

6. The liquid crystal display of claim 2, wherein at least one of the side chains of the first alignment layer and the second alignment layer includes a vertical alignment group.

7. The liquid crystal display of claim 1, wherein the liquid crystal molecules near the first alignment layer are pre-tilted.

8. The liquid crystal display of claim 1, wherein the liquid crystal molecules positioned near the second alignment layer are not pre-tilted.

9. The liquid crystal display of claim 1, wherein the liquid crystal display is curved in a long-axis direction.

10. The liquid crystal display of claim 1, wherein the liquid crystal layer has negative dielectric anisotropy.

11. The liquid crystal display of claim 10, wherein the liquid crystal layer further includes a reactive mesogen (RM).

12. The liquid crystal display of claim 1, wherein one of the first alignment layer and the second alignment layer includes a first structural unit represented by Chemical Formula 1:

[Chemical Formula 1]

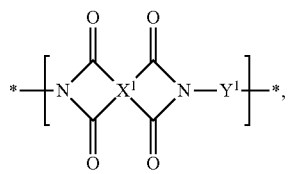

wherein, in Chemical Formula 1, $X^1$ is a tetravalent organic group derived from an alicyclic acid dianhydride or an aromatic acid dianhydride, $Y^1$ is a divalent organic group derived from an aromatic diamine, and at least one hydrogen of the divalent organic group is substituted by Chemical Formula 1A:

[Chemical Formula 1A]

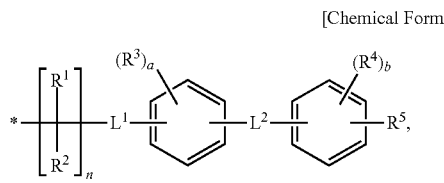

wherein, in Chemical Formula 1A, $R^1$ to $R^4$ are independently hydrogen or a substituted or unsubstituted C1 to C8 alkyl group, n is an integer that is in a range of 3 to 20, $R^5$ is a substituted or unsubstituted C1 to C30 alkyl group, "a" and "b" are independently integers that are in a range of 0 to 4, and $L^1$ and $L^2$ are independently a single bond, —O—, —S(=O)$_2$—, or —(C(R$^x$)(R$^y$))$_m$—, wherein R$^x$ and R$^y$ are independently hydrogen atoms, or a substituted or unsubstituted C1 to C8 alkyl group, and wherein m is an integer that is in a range of 1 to 20.

13. The liquid crystal display of claim 1, wherein the first alignment layer includes a structural unit represented by Chemical Formula 2:

[Chemical Formula 2]

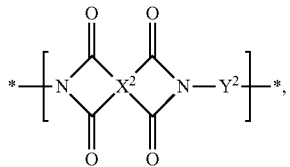

wherein, in Chemical Formula 2, $X^2$ is a tetravalent organic group derived from an alicyclic acid dianhydride or an aromatic acid dianhydride, $Y^2$ is a divalent organic group derived from an aromatic diamine, and at least one hydrogen of the divalent organic group is substituted with Chemical Formula 2A or Chemical Formula 2B:

[Chemical Formula 2A]

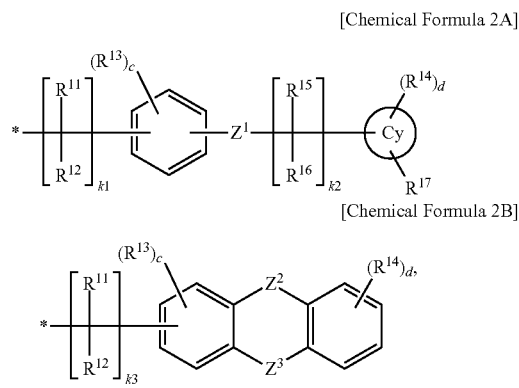

[Chemical Formula 2B]

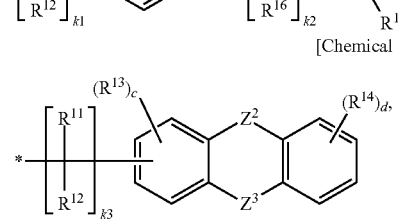

wherein, in Chemical Formula 2A and Chemical Formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, "c" and "d" are independently integers of 0 to 4, k1 and k3 are integers of 3 to 20, k2 is an integer of 0 to 5, and wherein $Z^1$ and $Z^2$ are independently —C(=O)—, and $Z^3$ is —S— or —C(=O)—.

14. The liquid crystal display of claim 1, wherein one of the first alignment layer and the second alignment layer includes a third-structural unit represented by Chemical Formula 3:

[Chemical Formula 3]

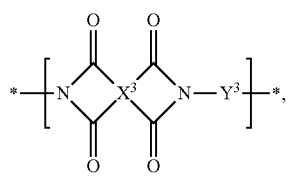

wherein, in Chemical Formula 3, $X^3$ is a tetravalent organic group derived from an alicyclic acid dianhydride or an aromatic acid dianhydride, $Y^3$ is a divalent organic group derived from an aromatic diamine, and at least one hydrogen of the divalent organic group is substituted by a substituted or unsubstituted C5 to C30 straight chain or branched chain alkyl group, wherein $CH_2$ groups that are not adjacent to each other in the alkyl group may be substituted by —O—, —N(R$^a$)—, —C(=O)O—, —C(=O)N(R$^b$)—, —N(R$^c$)C(=O)—, or —OC(=O)—, and wherein R$^a$, R$^b$, and R$^c$ are independently hydrogen or a substituted or unsubstituted C1 to C8 alkyl group.

15. A curved liquid crystal display comprising:
a first insulation substrate;
a pixel electrode disposed on the first insulation substrate;
a first alignment layer disposed on the pixel electrode;
a second insulation substrate facing the first insulation substrate;
a common electrode disposed on a surface of the second insulation substrate, the surface of the second insulation substrate facing the first insulation substrate;

a second alignment layer disposed on a surface of the common electrode, the surface of the common electrode facing the first insulation substrate; and a liquid crystal layer disposed between the first alignment layer and the second alignment layer, wherein the liquid crystal layer includes a plurality of liquid crystal molecules disposed adjacent to the first alignment layer and a plurality of liquid crystal molecules disposed adjacent to the second alignment layer, wherein the plurality of liquid crystal molecules adjacent to the first alignment layer have a pre-tilt angle with respect to the first alignment layer, wherein the plurality of liquid crystal molecules adjacent to the second alignment layer are vertically aligned with respect to the second alignment layer, the first alignment layer comprises at least one of a group of photo-reactive groups or photo-reactive derivatives, including at least one of a benzophenone group, an acetophenone group, a benzoin ether group, and a benzyl group, the first alignment layer includes an alignment polymer, wherein a reactive mesogen (RM) and the photo-reactive group or the photo-reactive derivative, are coupled to the alignment polymer, the second alignment layer comprises at least one of a group of ion inductors including at least one of a pyridine group, a pyrimidine group, an indole group, a furan group, and a quinoline group, the first alignment layer and the second alignment layer comprise different materials from each other, the first alignment layer and the second alignment layer attract ion impurities having a same polarity included in the liquid crystal layer, and the liquid crystal molecules in the liquid crystal layer are inclined in four different directions when in the presence of an electric field.

16. The liquid crystal display of claim 15, wherein the first alignment layer and the second alignment layer each include a main chain and a side chain connected to the main chain.

17. The liquid crystal display of claim 15, wherein one of the first alignment layer and the second alignment layer includes a structural unit represented by Chemical Formula 1:

[Chemical Formula 1]

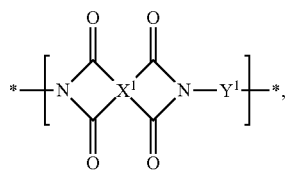

wherein, in Chemical Formula 1, $X^1$ is a tetravalent organic group derived from an alicyclic acid dianhydride or an aromatic acid dianhydride, $Y^1$ is a divalent organic group derived from an aromatic diamine, and at least one hydrogen of the divalent organic group is substituted by Chemical Formula 1A:

[Chemical Formula 1A]

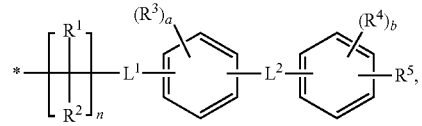

wherein, in Chemical Formula 1A, $R^1$ to $R^4$ are independently hydrogen or a substituted or unsubstituted C1 to C8 alkyl group, n is an integer that is in a range of 3 to 20, $R^5$ is a substituted or unsubstituted C1 to C30 alkyl group, "a" and "b" are independently integers that are in a range of 0 to 4, and $L^1$ and $L^2$ are independently a single bond, —O—, —S(=O)$_2$—, or —(C(R$^x$)(R$^y$))$_m$—, wherein $R^x$ and $R^y$ are independently hydrogen atoms, or a substituted or unsubstituted C1 to C8 alkyl group, and wherein m is an integer that is in a range of 1 to 20.

18. The liquid crystal display of claim 15, wherein the first alignment layer includes a structural unit represented by Chemical Formula 2:

[Chemical Formula 2]

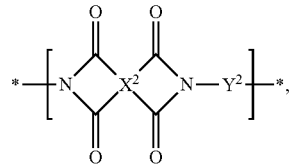

wherein, in Chemical Formula 2, $X^2$ is a tetravalent organic group derived from an alicyclic acid dianhydride or an aromatic acid dianhydride, $Y^2$ is a divalent organic group derived from an aromatic diamine, and at least one hydrogen of the divalent organic group is substituted with Chemical Formula 2A or Chemical Formula 2B:

[Chemical Formula 2A]

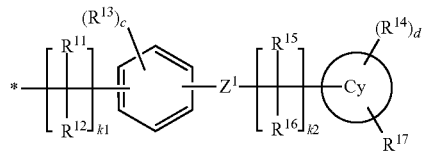

[Chemical Formula 2B]

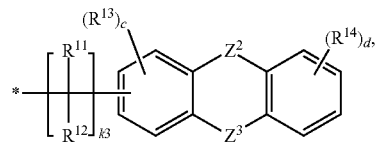

wherein, in Chemical Formula 2A and Chemical Formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, "c" and "d" are independently integers of 0 to 4, k1 and k3 are integers of 3 to 20, k2 is an integer of 0 to 5, and wherein $Z^1$ and $Z^2$ are independently —C(=O)—, and $Z^3$ is —S— or —C(=O)—.

* * * * *